United States Patent Office 2,709,104
Patented May 24, 1955

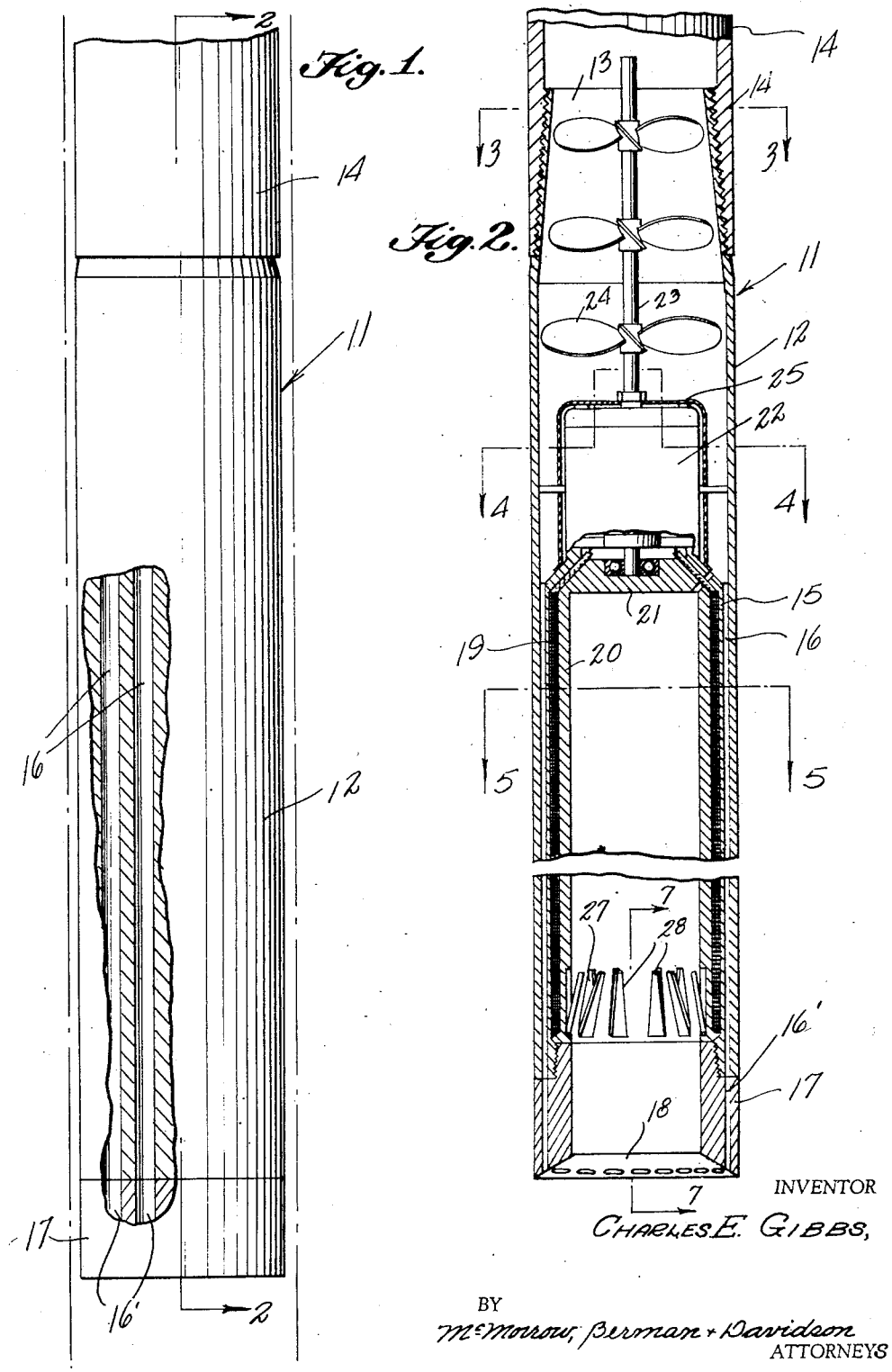

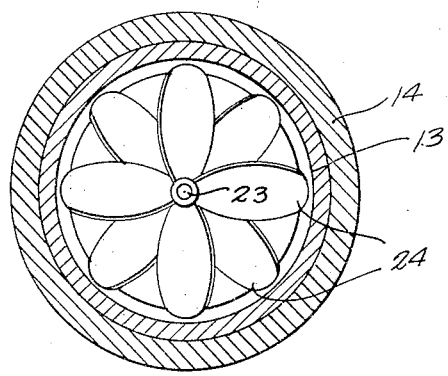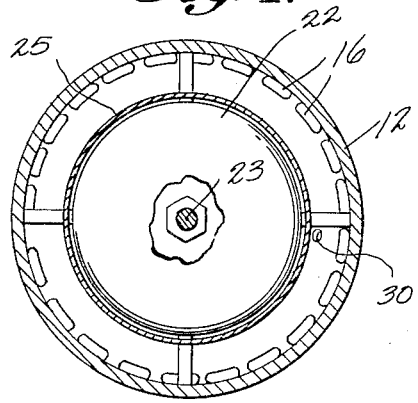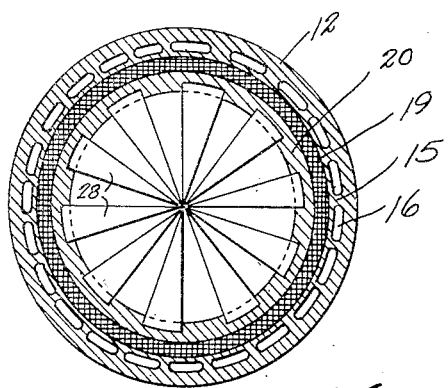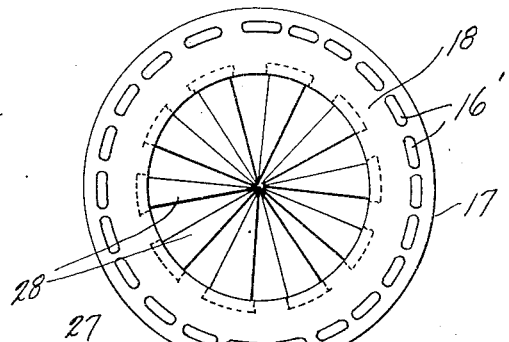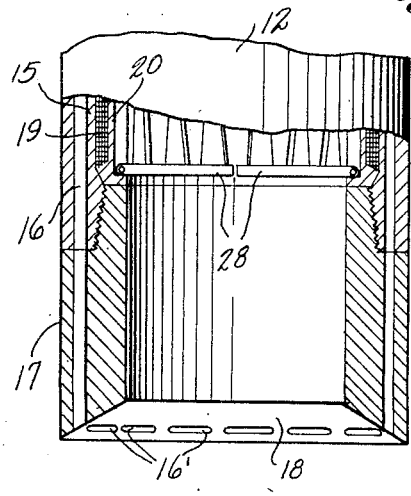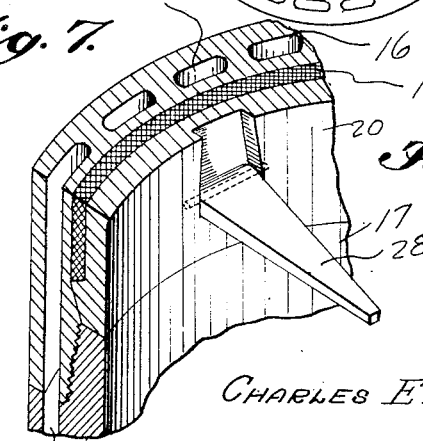

2,709,104

OIL WELL FISHING TOOL

Charles E. Gibbs, Midland, Tex.

Application April 29, 1952, Serial No. 284,950

2 Claims. (Cl. 294—65.5)

This invention relates to oil well fishing tools, and more particularly to an improved electrical fishing tool to be employed in an oil well for removing metallic articles from the bottom of the well, such as broken drill parts and the like.

A main object of the invention is to provide a novel and improved electric fishing tool for use in removing metallic debris from oil wells, the improved tool being simple in construction, being easy to manipulate, and requiring no electrical cables to be lowered into the oil well with the tool, since the tool generates its own current.

A further object of the invention is to provide an improved electric fishing tool adapted to be employed on rotary type oil and gas well rigs or drilling equipment, where mud or water circulation to the drill pipe or tool is used, the fishing tool involving inexpensive components, being rugged in construction, and enabling metallic debris in the bottom of a well to be rapidly and easily removed.

Further objects and advantages of the invention will become apparent from the following description and claims, and from the accompanying drawings, wherein:

Figure 1 is a side elevational view, partly in cross section, of an improved fishing tool according to the present invention, shown installed on the end of a drill pipe.

Figure 2 is a cross sectional view taken on the line 2—2 of Figure 1.

Figure 3 is an enlarged cross sectional view taken on the line 3—3 of Figure 2.

Figure 4 is an enlarged cross sectional view taken on the line 4—4 of Figure 2.

Figure 5 is an enlarged cross sectional view taken on the line 5—5 of Figure 2.

Figure 6 is an enlarged bottom view of the fishing tool of Figures 1 and 2.

Figure 7 is an enlarged cross sectional view taken on the line 7—7 of Figure 2.

Figure 8 is an enlarged fragmentary perspective cross sectional detail view showing one of the catcher bars of the tool in its normal, inwardly extending horizontal position.

Referring to the drawings, the illustrated fishing tool, generally designated 11, comprises an elongated tubular casing 12 which has a tapering top or upper end portion 13 formed with external threads to threadedly engage the internal threads of the lower end of a drill pipe 14, as shown in Figure 2. The casing 12 has a thickened lower wall portion 15 which is formed with the longitudinally extending passages 16 opening at the top of the thickened portion 15, as shown in Figure 2. Threadedly secured to the lower end of the casing 12 is the removable annular wear shoe 17 having an upwardly beveled lower end 18. The wear shoe 17 is formed with spaced passages 16' which are in registry with the passages 16, the passages 16' and open through beveled surface 18 at the bottom rim of the shoe 17.

Secured within the thickened portion 15 is a tubular electromagnet winding 19, said electromagnet winding being wound on a tubular core 20 and being rigidly secured to the thickened portion 15 of casing 12. The tubular core 20 is closed by a preferably integral top wall 21 on which is vertically mounted an electric generator 22, said generator having its shaft 23 extending axially upwardly in the upper portion of the casing 12 and having a plurality of impeller vane assemblies 24 secured in vertically spaced relationship on said shaft, as shown in Figure 2. The generator 22 is provided with a waterproof protective shield 25 covering the generator and secured to the top wall 21, as shown, the shaft 23 extending through the shield 25 and being substantially sealed with respect thereto. The generator is connected to the electromagnet winding 19 to energize same when the shaft 23 is rotated, as will be subsequently explained.

The tubular core 20 is formed at its lower rim portion with a plurality of spaced internal recesses 27 in which are pivoted the respective catcher bars 28, said bars normally extending inwardly and being supported in substantially horizontal positions on the bottom walls of the respective recesses 27, as shown in Figure 8, but are freely rotatable upwardly into their recesses 27 in response to upward force exerted on said bars.

The top wall 21 is provided with at least one vent opening 30 to allow water to escape upwardly through said wall into the space adjacent the top ends of the passages 16.

As shown in Figure 1 the fishing tool is fastened to the drill pipe. Water or mud is pumped from the surface through the drill pipe into the upper portion of the casing 12 and flows downwardly through the passages 16. The flow of water downwardly through the upper portion of the casing 12 causes the vanes 24 to rotate, driving the generator 22 and thus energizing the electromagnet 19. The water or mud continues on through the passages 16 to the bottom of the tool and escapes into the well, thereby creating a circulation that enables the tool to be lowered to the bottom of the hole and washing the sediment in the hole from the junk or metallic debris which is to be picked up by the fishing tool. The catcher arms 28 remain in elevated positions while the water is being circulated, and the metallic debris or fragments are drawn into the tubular core 20 of the electromagnet. When the circulation is stopped, the catcher bars 28 fall to their normal, inwardly extending, substantially horizontal positions, holding the junk and metallic debris in the tubular core 20. The junk and debris may then be removed by raising the drill pipe 14.

While a specific embodiment of an oil well fishing tool has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In a well fishing tool, a tubular casing having an upper end portion connected to the lower end of a drill pipe and having a lower end, said casing having a thickened sidewall portion extending from its lower end to a point spaced below said upper end portion, said thickened sidewall portion having vertical passage means therein opening through the upper and lower ends of said thickened wall portion within said casing, a top wall on the upper end of said thickened wall portion and extending across the casing, said top wall having a circulation hole therein leading from the interior of the casing below said top wall to the interior of the casing above said top wall, and a tubular magnet open at its upper and lower ends and fixedly positioned in the casing within said thickened wall portion, said magnet comprising an electromagnet winding, a tubular magnetic core within said winding and engaged with said top wall, an electric generator having a vertical shaft, said generator being mounted on said top wall and electrically connected to said electromagnet winding, said shaft extending above said generator and having impeller blades thereon.

2. In a well fishing tool, a tubular casing having an open upper end connected to the lower end of a drill pipe and in communication with the drill pipe, said casing having a lower end portion having a thickened side wall having an upper end and a lower end, circumferentially spaced passages provided in said side wall and opening through the upper and lower ends of said side wall, a tubular core within said side wall, said core having a portion thereof concentrically spaced from said side wall providing a chamber extending from a point near and spaced from the lower end of said side wall to the upper end of said side wall, a tubular electromagnet positioned in and occupying said chamber, a top wall closing the upper ends of said chamber and said side wall, and means for supplying electric current connected to said electromagnet, said means comprising a generator mounted on the upper side of said top wall within the space in said casing between said top wall and the upper end of the casing, said generator comprising a shaft projecting upwardly within said space and having impeller blades thereon.

References Cited in the file of this patent

UNITED STATES PATENTS

| | | |
|---|---|---|
| 2,299,406 | Potter | Oct. 20, 1942 |
| 2,431,361 | Athy | Nov. 25, 1947 |
| 2,436,683 | Wood, Jr. | Feb. 24, 1948 |
| 2,493,992 | Murphy et al. | Jan. 10, 1950 |
| 2,509,442 | Matheisel | May 30, 1950 |
| 2,524,031 | Arps | Oct. 3, 1950 |
| 2,539,435 | Kirby II | Jan. 30, 1951 |
| 2,657,752 | Ballew et al. | Nov. 3, 1953 |

FOREIGN PATENTS

| | | |
|---|---|---|
| 15,994 | Great Britain | July 8, 1909 |